United States Patent [19]

White et al.

[11] Patent Number: 4,517,352

[45] Date of Patent: May 14, 1985

[54] ONE PACKAGE, STABLE, MOISTURE CURABLE, POLYALKOXY-TERMINATED ORGANOPOLYSILOXANE COMPOSITIONS AND METHOD FOR MAKING

[75] Inventors: Mary A. White; Melvin D. Beers, both of Schenectady; Gary M. Lucas, Scotia; Robert A. Smith; Roger T. Swiger, both of Schenectady, all of N.Y.

[73] Assignee: General Electric Company, Waterford, N.Y.

[21] Appl. No.: 486,975

[22] Filed: Apr. 20, 1983

Related U.S. Application Data

[62] Division of Ser. No. 277,524, Jun. 26, 1981, Pat. No. 4,395,526.

[51] Int. Cl.³ ............................................. C08G 77/06
[52] U.S. Cl. ......................................... 528/18; 528/34; 528/901
[58] Field of Search ...................... 528/901, 34, 18, 21

[56] References Cited

U.S. PATENT DOCUMENTS

| | | | |
|---|---|---|---|
| 3,364,160 | 1/1968 | Golitz et al. | 528/34 |
| 3,364,175 | 1/1968 | DiPaola | 528/34 |
| 3,378,520 | 4/1968 | Sattlegger et al. | 528/34 |
| 3,417,047 | 12/1968 | Golitz et al. | 528/34 |
| 3,471,434 | 10/1969 | Pande et al. | 528/34 |
| 3,560,442 | 2/1971 | Golitz et al. | 528/34 |
| 3,622,529 | 11/1971 | Evans | 528/34 |
| 3,896,079 | 7/1975 | Boissieras et al. | 528/901 |
| 4,176,112 | 11/1979 | Cella | 528/901 |
| 4,220,748 | 9/1980 | Hashimoto et al. | 528/901 |
| 4,395,526 | 7/1983 | White et al. | 528/15 |
| 4,417,042 | 11/1983 | Dziark | 528/22 |
| 4,424,157 | 1/1984 | Chung | 528/21 |
| 4,448,928 | 5/1984 | Klein et al. | 528/22 |

Primary Examiner—Melvyn I. Marquis

[57] ABSTRACT

Stable, substantially acid-free, one package moisture curable polyalkoxy-terminated organopolysiloxane compositions are provided having a condensation catalyst such as a tin compound. A method for making the aforesaid moisture curable organopolysiloxane compositions, is also provided.

13 Claims, No Drawings

ONE PACKAGE, STABLE, MOISTURE CURABLE, POLYALKOXY-TERMINATED ORGANOPOLYSILOXANE COMPOSITIONS AND METHOD FOR MAKING

CROSS REFERENCE TO RELATED APPLICATIONS

This application is a division of application Ser. No. 277,524, filed June 26, 1981, now U.S. Pat. No. 4,395,526.

Reference is made to copending application RD-13421, of John E. Hallgren, for Dialkoxysilylenolethers and method for making.

BACKGROUND OF THE INVENTION

Prior to the present invention, various one and two-package moisture curable room temperature vulcanizable (RTV) compositions were available based on the use of a silanol-terminated polydiorganosiloxane having the formula,

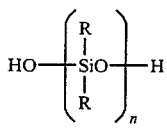

where R is a $C_{(1-13)}$ monovalent substituted or unsubstituted hydrocarbon radical, which is preferably methyl, or a mixture of a major amount of methyl and a minor amount of phenyl, cyanoethyl, trifluoropropyl, vinyl, and mixtures thereof and n is an integer having a value of from about 50 to about 2500, with a cross-linking silane having hydrolyzable radicals attached to silicon.

For example, Ceyzeriat, U.S. Pat. No. 3,133,891 and Bruner, U.S. Pat. No. 3,035,016, are based on the use of methyltriacetoxysilane with a silanol-terminated polydimethylsiloxane under substantially anhydrous conditions. Although the one-package compositions of Bruner or Ceyzeriat, upon exposure to atmospheric moisture, provide satisfactory one-package room temperature vulcanizable organopolysiloxane compositions exhibiting satisfactory tack-free time, for example, 30 minutes or less after an extended shelf period, the acetic acid by-product is corrosive and has a disagreeable odor.

Other variations of one-package acyloxy acid generating RTV's are shown in Kulpa, U.S. Pat. Nos. 3,296,161, Goossens, 3,296,195 and Beers, 3,438,930, assigned to the same assignee as the present invention. Additional one-package acyloxy acid generating RTV compositions are shown by Schulz et al, U.S. Pat. No. 3,647,917 and Nitzsche et al U.S. Pat. No. 3,886,118.

An improved, low odor, substantially non-corrosive one-package RTV composition is shown by Beers, U.S. Pat. No. 4,257,932, assigned to the same assignee as the present invention. Beers achieves a reduction in odor and corrosive properties by utilizing as a cross-linking silane a less volatile material such as methyltris-(2-ethylhexanoxy)silane.

A non-corrosive two package moisture curable organopolysiloxane composition free of carboxylic acid generating groups is shown by Nitzsche et al, U.S. Pat. No. 3,127,363 which is based on the use of a polyalkoxysilane, or polysilicate cross linking agent, in place of methyltriacetoxysilane. The ingredients of the two package noncorrosive composition of Nitzsche et al, are mixed under atmospheric conditions and the resulting composition must be used soon after the ingredients are mixed because the resulting blend has a short shelf life. Although the mixture of Nitzsche et al, which is typically polyalkoxysilane, silanol-terminated polydiorganosiloxane and tin soap catalyst, provides upon mixing, a fast curing non-corrosive room temperature vulcanizable composition, the Nitzsche et al mixture does not have the extended shelf life advantage of the one package system which is required for commercial use and therefore is excluded from a variety of applications.

Nitzsche et al, U.S. Pat. No. 3,065,194, teaches that a mixture of an endblocked dimethylsiloxane polymer, such as hydroxy and alkoxy endblocked, inert filler, ethylorthosilicate and dibutyltindilaurate can be vulcanized upon contact with water, after a 14 day shelf period at room temperature. However, the various ingredients of the mixture have to be vigorously dried by heating for 1 hour at 200° C., and the RTV, after a relatively short shelf period, has to be drenched with water.

Improved results toward combining the advantages of a non-corrosive acid-free polyalkoxysilane cross-linking agent with a silanol-terminated polydiorganosiloxane as a one-package system are shown by Weyenberg, U.S. Pat. Nos. 3,334,067, Cooper et al, 3,542,901 and by Smith et al U.S. Pat. Nos. 3,689,454, and 3,779,986, the last two being assigned to the same assignee as the present invention, utilizing a titanium chelate catalyst in place of a tin catalyst. However, after room temperature vulcanizable one-package systems based on a titanium chelate catalyst were allowed to age for a period of 5 hours or more, it was found that the tack-free time of the aged RTV was considerably longer than the tack-free time of the same mixture after it was initially mixed and immediately exposed to atmospheric moisture.

As shown by Brown et al U.S. Pat. No. 3,122,522 a platinum catalyst is used to prepare an alkoxy terminated silalkylenepolysiloxane polymer. However, this method of synthesizing the base polymer requires an expensive hydrosilylation procedure. Additional efforts to achieve a desirable non-corrosive, substantially odor-free stable one-package RTV based on the use of polyalkoxy organopolysiloxane in a more economic manner are shown by Brown et al, U.S. Pat. No. 3,161,614 or U.S. Pat. No. RE-29760. Brown et al employed a polyalkoxy end blocked polysiloxane which was based on the use of a mineral acid generating polyalkoxyhalosilane, and a curing catalyst. However, these compositions were found to be unusable because they failed to cure in contact with a tin catalyst, even in the presence of moisture.

As utilized hereinafter, the term "stable" as applied to the one package polyalkoxy-terminated organopolysiloxane RTV's of the present invention means a moisture curable mixture capable of remaining substantially unchanged while excluded from atmospheric moisture and which cures to a tack-free elastomer after an extended shelf period. In addition, a stable RTV also means that the tack-free time exhibited by freshly mixed RTV ingredients under atmospheric conditions will be substantially the same as that exhibited by the same mixture of ingredients exposed to atmospheric moisture after having been held in a moisture resistant and moisture-free container for an extended shelf period at ambient conditions, or an equivalent period based on accelerated aging at an elevated temperature.

The present invention is based on the discovery that stable, substantially acid-free, one-package, moisture curable polyalkoxy-terminated organopolysiloxane RTV compositions can be made by using a silanol terminated polydiorganosiloxane consisting essentially of chemically combined diorganosiloxy units of the formula $$-\underset{\underset{R}{|}}{\overset{\overset{R}{|}}{Si}}O-, \quad (2)$$

such as a silanol-terminated polydiorganosiloxane of formula (1), where R is as previously defined, with an effective amount of certain silane scavengers for chemically combined hydroxy radicals. In the silanol-terminated polydiorganosiloxane consisting essentially of chemically combined formula (2) units, the presence of silicon bonded $C_{(1-8)}$ alkoxy radicals such as methoxy radical is not precluded. The hydroxy radicals which can be removed by the silane scavenger can be found in materials normally present in the RTV composition of the present invention, for example, trace amounts of water, methanol, silanol radicals on the silica filler (if used), the silanol polymer of formula (1), or a silanol-terminated polymer having formula (2) units. The silane scavenger useful for eliminating chemically combined hydroxy radicals in accordance with the practice of the invention preferably has the formula, $$(R^1O)_{4-(a+b)}\underset{\underset{}{|}}{\overset{\overset{(R^2)_b}{|}}{Si}}(X)_a, \quad (3)$$

where $R^1$ is a $C_{(1-8)}$ aliphatic organic radical selected from alkyl radicals, alkylether radicals, alkylester radicals, alkylketone radicals and alkylcyano or a $C_{(7-13)}$ aralkyl radical, $R^2$ is a $C_{(1-13)}$ monovalent organic radical selected from R radicals as previously defined, and defined more particularly below, X is a hydrolyzable leaving group selected from amido, amino, carbamato, enoxy, imidato, isocyanato, oximato, thioisocyanato, and ureido radicals. The preferred members are amino, amido, enoxy, and the more preferred is amido, for example, N-$C_{(1-8)}$ alkyl$C_{(1-8)}$ acylamido, a is an integer equal to 1 or 2 and preferably 1, b is a whole number equal to 0 or 1 and the sum of a+b is equal to 1 or 2. In formula (3), where a is 2, X can be the same or different. The leaving group X reacts preferentially before $-OR^1$ with available $-OH$ in the RTV composition and provides an RTV composition substantially free of halogen acid, or carboxylic acid. The silane scavenger of formula (3) is both the silane scavenger for hydroxy functional groups and a polyalkoxysilane cross-linking agent for terminating the silicon atom at each organopolysiloxane chain-end with at least two alkoxy radicals.

Among the ingredients of the RTV compositions which are formed as a result of the use of the hydroxy scavenger of formula (3), is silanol-free polydiorganosiloxane, chain-terminated with two or three $-OR^1$ radicals. The silanol-free polydiorganosiloxane optionally can be combined with an effective amount of a cross-linking silane, as defined hereinafter, under substantially anhydrous conditions. The cross-linking polyalkoxysilane which can be utilized in combination with the scavenging silane of formula (3) has the formula, $$(R^1O)_{4-b}\underset{\underset{}{|}}{\overset{\overset{(R^2)_b}{|}}{Si}}, \quad (4)$$

where $R^1$, $R^2$ and b are as previously defined. The preferred condensation catalysts which can be used in the practice of the invention include metal compounds selected from tin compounds, zirconium compounds, and titanium compounds or mixtures thereof. Additional condensation catalysts which can be used are defined more particularly hereinafter.

It is not completely understood why the polyalkoxy-terminated organopolysiloxane compositions of the present invention are stable in the presence of certain condensation catalysts over an extended period of time in the substantial absence of moisture.

A mechanistic study of the RTV of the present invention supports the theory that the use of scavenging silane of formula (3) or (5) below or in combinations thereof with crosslinking silane of formula (4), in accordance with the practice of the invention, minimize the likelihood that detrimental amounts of $R^1OH$ will be generated during the shelf period. $R^1OH$ generation is to be avoided because $R^1$-OH endstops the silanol polymer of formula (1) or polymer with formula (2) units to produce polymers having terminal $$-\underset{\underset{R}{|}}{\overset{\overset{R}{|}}{Si}}-OR^1$$

units. These polymers, wherein the silicon atom at each polymer chain end is terminated with only one alkoxy radical, have slow cure times. In addition, $R^1OH$ can breakdown the organopolysiloxane polymer in the presence of the condensation catalyst.

The aforedescribed one package RTV compositions of Brown et al are unstable. In Brown et al, which uses chloroalkoxysilanes, the chloro radical is the leaving group. It has been found that chloro radical leaving groups can form highly corrosive halogen acids, or halogen acid amine salts, when used with an acid acceptor, such as pyridine.

The use of the silane scavenger for hydroxy of formulas (3) or (5), in which the leaving group X is not a halogen radical, substantially eliminates undesirable water in the filler and silicone polymer, as well as residual moisture in the RTV composition during the shelf period. In determining what level of silane scavenger of formula (3) or (5) to use in the practice of the invention, the total hydroxy functionality of the RTV composition can be estimated. The total hydroxy functionality of the polymer can be determined by infrared analysis. In order to insure that an effective or stabilizing amount of scavenger is used to maintain the stability of the composition over an extended shelf period of six months or more at ambient temperature while in a sealed container, there can be used an additional amount of scavenger over that amount required to endstop the polymer. This excess of scavenger can be up to about 3% by weight, based on the weight of the polymer. The aforementioned 3% of scavenger by weight exceeds that amount required to substantially eliminate available hydroxy functionality in the polymer as a result of reaction between OH functionality and X radicals. In compositions which also contain filler and other additives, the additional amount of scavenger of formulas (3) or (5) which is required is estimated by running a 48 hour stability check at 100° C. to determine whether the tack-free time remains substantially unchanged as compared to the tack-free time of the composition before aging measured under substantially the same conditions.

Where polyalkoxy-terminated polymer of formula (6) below is made without using silane scavenger of formula (3), silane scavenger can be used in the practice of the invention having less than two —OR$^1$ radicals attached to silicon, as shown by the formula;

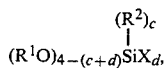  (5)

where $R^1$, $R^2$, and X are as previously defined, c is a whole number equal to 0 to 3 inclusive, d is an integer equal to 1 to 4 inclusive, and the sum of (c+d) is equal to 3 or 4. In such situations, the scavenging silanes of formula (5) can be used in an amount sufficient to stabilize the RTV composition as previously defined for the scavenging silane of formula (3). In addition, there can be used with scavengers of formulas (3) or (5) at least 0.01 part and up to 10 parts of the cross-linking silane of formula (4).

The polyalkoxy-terminated organopolysiloxane of the present invention has the formula,

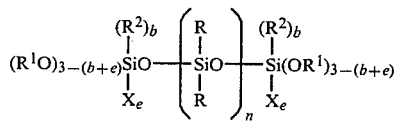  (6)

where R, $R^1$, $R^2$, X, n and b are as previously defined and e is equal to 0 to 1 and the sum of b+e is equal to 0 to 1. The polyalkoxy-terminated organopolysiloxane of formula (6), can be made by various procedures. One procedure is taught by Cooper et al U.S. Pat. No. 3,542,901 involving the use of a polyalkoxysilane with a silanol terminated polydiorganosiloxane in the presence of an amine catalyst. A method not taught by Cooper et al is the use of the silane scavenger of formula (3) as an end-capper with silanol-terminated polydiorganosiloxane used in the the practice of the invention.

In formulas (1-6), R is preferably selected from C$_{(1-13)}$ monovalent hydrocarbon radicals, halogenated hydrocarbon radicals and cyano alkyl radicals, $R^1$ is preferably a C$_{(1-8)}$ alkyl radical or a C$_{(7-13)}$ aralkyl radical, $R^2$ is preferably methyl, phenyl, or vinyl.

The preferred X radicals in formulas 3, 5 and 6 are amido, amino and enoxy, and the most preferred is amido.

The expression "substantially acid-free" with respect to defining the elastomer made from the RTV composition of the present invention upon exposure to atmospheric moisture means yielding by-products having a pKa of 5.5 or greater with 6 or greater preferred and 10 or greater being particularly preferred.

It has been further found that improved cure rates can be achieved if minor amounts of amines, substituted guanidines, or mixtures thereof, are utilized as curing accelerators in the polyalkoxy compositions of the present invention. These curing accelerators also serve to catalyze the ability of the enoxy leaving group to act as a scavenger. There can be used from 0.1 to 5 parts, and preferably from about 0.3 to 1 part of curing accelerator, per 100 parts of the silanol-terminated polymer of formula (1), or which consists of chemically combined units of formula (2), or 100 parts of the polyalkoxy-terminated polymer of formula (6) to substantially reduce the tack-free time (TFT) of the RTV composition of the present invention. This enhanced cure rate is maintained after it has been aged for an extended shelf period, for example, 6 months or more at ambient temperatures, or a comparable period under accelerated aging conditions. Its cure properties after the extended shelf period will be substantially similar to its initial cure properties, for example, tack-free time (TFT), shown by the RTV composition upon being freshly mixed and immediately exposed to atmospheric moisture.

It appears that the curing accelerators described herein, in addition to decreasing the tack-free times of the RTV compositions of this invention, also provide a surprising stabilizing effect for particular RTV compositions catalyzed with certain condensation catalysts which exhibit a marked lengthening of tack-free time after accelerated aging. For this class of condensation catalysts, addition of amines, substituted guanidines and mixtures thereof described herein provide stable RTV compositions which exhibit a fast cure rate initially, i.e. less than about 30 minutes which remains substantially unchanged after accelerated aging.

The RTV compositions of the present invention can cure to a depth of ⅛" thickness within 24 hours. Durometer Hardness (Shore A) can then be determined and used to evaluate the cure of the compositions as shown in the examples.

STATEMENT OF THE INVENTION

There is provided by the present invention, a one-package, substantially anhydrous, room temperature vulcanizable organopolysiloxane composition stable under ambient conditions in the substantial absence of moisture over an extended period of time and convertible to a substantially acid-free, tack-free elastomer comprising, (1) an organopolysiloxane wherein the silicon atom at each polymer chain end is terminated with at least two alkoxy radicals, (2) an effective amount of condensation catalyst and (3) a stabilizing amount of scavenging silane of the formula,

  (7)

where $R^1$, $R^2$, X and c are as previously defined, f is an integer equal to 1 to 4 inclusive, and the sum of c+f is equal to 1 to 4 inclusive. In addition, an effective amount of a curing accelerator selected from substituted guanidines, amines and mixtures thereof is used.

In a further aspect of the present invention, there is provided a stable room temperature vulcanizable polyalkoxy-terminated organopolysiloxane composition curable under ambient conditions to a tack-free, substantially acid-free elastomer comprising, (A) 100 parts of a polyalkoxy-terminated organopolysiloxane of formula (6)
(B) 0 to 10 parts of a cross-linking silane of formula (4),
(C) an effective amount of condensation catalyst, and (D) a stabilizing amount of scavenging silane of formula (7).

Also included within the scope of the present invention is a method of making a room temperature vulcanizable organopolysiloxane composition under substantially anhydrous conditions utilizing an effective amount of a condensation catalyst with a silanol-terminated organopolysiloxane and a polyalkoxysilane cross-linking agent, the improvement which comprises (1) adding to the silanol-terminated organopolysiloxane a stabilizing amount of a polyalkoxysilane which is both a scavenger for hydroxy functional groups and a cross-linking agent of the formula $$(R^1O)_{4-(b+a)}Si(X)_a(R^2)_b$$

where $R^1$, $R^2$, X, a and b are as previously defined, and thereafter adding an effective amount of a condensation catalyst, whereby improved stability is achieved in the resulting room temperature vulcanizable organopolysiloxane composition.

Another method of the present invention is making a room temperature vulcanizable organopolysiloxane composition under substantially anhydrous conditions utilizing an effective amount of a condensation catalyst with an organopolysiloxane wherein the silicon atom at each polymer chain end is terminated with at least two alkoxy radicals, which involves the improvement which comprises adding to said polyalkoxy-terminated organopolysiloxane (1) a stabilizing amount of a silane scavenger for hydroxy functional groups of the formula, $$(R^1O)_{4-(c+f)}Si(X)_f(R^2)_c$$

where $R^1$, $R^2$, X, c and f are as previously defined and (2) an effective amount of a condensation catalyst, whereby improved stability is achieved in the resulting room temperature vulcanizable organopolysiloxane composition.

In an additional aspect of the present invention, there is provided a method of making a stable, one-package room temperature vulcanizable polyalkoxy-terminated organopolysiloxane composition which comprises agitating, under substantially anhydrous conditions, a room temperature vulcanizable material selected from
(i) a mixture comprising on a weight basis
  (a) 100 parts of a silanol-terminated polydiorganosiloxane consisting essentially of chemically combined units of formula (2),
  (b) an amount of silane of formula (3) sufficient to scavenge available —OH in the RTV composition and provide up to 3% by weight excess, based on the weight of RTV composition,
  (c) 0 to 10 parts of the cross-linking silane of formula (4),
  (d) an effective amount of a condensation catalyst, and
  (e) 0 to 5 parts of curing accelerator selected from substituted guanidines, amines and mixtures thereof wherein, the condensation catalyst is added after the silanol-terminated polydiorganosiloxane and scavenging silane are mixed; and
(ii) a mixture comprising,
  (a) 100 parts of the polyalkoxy-terminated organopolysiloxane of formula (6),
  (b) 0 to 10 parts of the cross-linking silane of formula (4),
  (c) an effective amount of a condensation catalyst,
  (d) a stabilizing amount of silane scavenger of formula (7), and
  (e) 0 to 5 parts of curing accelerator selected from substituted guanidines, amines and mixtures thereof.

Radicals included within R of formulas (1), (2) and (6) are, for example, aryl radicals and halogenated aryl radicals, such as phenyl, tolyl, chlorophenyl, naphthyl; aliphatic and cycloaliphatic radicals, for example, cyclohexyl, cyclobutyl; alkyl and alkenyl radicals, such as methyl, ethyl, propyl, chloropropyl, vinyl, allyl, trifluoropropyl; and cyanoalkyl radicals, for example, cyanoethyl, cyanopropyl, cyanobutyl. Radicals preferably included within $R^1$ are, for example, $C_{(1-8)}$ alkyl radicals, for example, methyl, ethyl, propyl, butyl, pentyl; $C_{(7-13)}$ aralkyl radicals, for example, benzyl; phenethyl; alkylether radicals such as 2-methoxyethyl; alkylester radicals, for example 2-acetoxyethyl; alkylketone radicals, for example 1-butan-3-onyl; alkylcyano radicals, for example 2-cyanoethyl. Radicals included within $R^2$ are the same or different radicals included within R radicals. In formulas (1–7), where R, $R^1$, and $R^2$, can be more than 1 radical, these radicals can be the same or different.

Some of the scavengers for chemically combined hydroxy radicals included within one or more of formulas (3), (5), and (7), are, for example,
Oximatosilanes such as,
methyldimethoxy(ethylmethylketoximo)silane;
methylmethoxybis-(ethylmethylketoximo)silane;
methyldimethoxy(acetaldoximo)silane.
Carbamatosilanes such as,
methyldimethoxy(N-methylcarbamato)silane;
ethyldimethoxy(N-methylcarbamato)silane.
Enoxysilanes such as,
methyldimethoxyisopropenoxysilane;
trimethoxyisopropenoxysilane;
methyltri-iso-propenoxysilane;
methyldimethoxy(but-2-ene-2-oxy)silane;
methyldimethoxy(1-phenylethenoxy)silane;
methyldimethoxy-2(1-carboethoxypropenoxy)silane.
Aminosilanes such as,
methylmethoxydi-N-methylaminosilane;
vinyldimethoxymethylaminosilane;
tetra-N,N-diethylaminosilane
methyldimethoxylaminosilane;
methyltricyclohexylaminosilane;
methyldimethoxyethylaminosilane;
dimethyldi-N,N-dimethylaminosilane;
methyldimethoxyisopropylaminosilane
dimethyldi-N,N-diethylaminosilane.
Amidosilanes such as,
ethyldimethoxy(N-ethylpropionamido)silane;
methylmethoxydi(N-methylacetamido)silane;
methyldimethoxy(N-methylacetamido)silane;
methyltri(N-methylacetamido)silane;
ethyldimethoxy(N-methylacetamido)silane;
methyltri(N-methylbenzamido)silane;
methylmethoxybis(N-methylacetamido)silane;
methyldimethoxy(caprolactamo)silane.
trimethoxy(N-methylacetamido)silane.
Imidatosilanes such as,
methyldimethoxyethylacetimidatosilane;

methyldimethoxypropylacetimidatosilane;.
Ureidosilanes such as,
methyldimethoxy(N,N',N'-trimethylureido)silane;
methyldimethoxy(N-allyl-N',N'-dimethylureido)silane;
methyldimethoxy(N-phenyl-N',N'-dimethylureido)silane.
Isocyanatosilanes such as,
methyldimethoxyisocyanatosilane;
dimethoxydiisocyanatosilane;.
Thioisocyanatosilanes such as,
methyldimethoxythioisocyanatosilane;
methylmethoxydithioisocyanatosilane.

In addition, formula (5) scavenging silanes include silanes such as methyltris(N-methylacetamido)silane; tetra(isopropenoxy)silane. Also included are silanes having different leaving groups such as diethylamino(N-methylcarbamato)isopropenoxy(N-allyl-N',N'-dimethylureido)silane.

Some of the cross-linking polyalkoxysilanes included within formula (4) are, for example, methyltrimethoxysilane; methyltriethoxysilane; ethyltrimethoxysilane; tetraethoxysilane; vinyltrimethoxysilane; etc.

Among the curing accelerators which can be used in the practice of the invention are silyl substituted guanidines having the formula, $$(Z)_g Si(OR^1)_{4-g}, \quad (8)$$

where $R^1$ is as previously defined, Z is a guanidine radical of the formula,

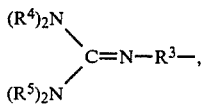

$R^3$ is divalent $C_{(2-8)}$ alkylene radical, $R^4$ and $R^5$ are selected from hydrogen and $C_{(1-8)}$ alkyl radicals and g is an integer equal to 1 to 3 inclusive. In addition, alkyl substituted guanidines having the formula,

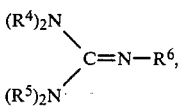

where $R^4$ and $R^5$ are as previously defined and $R^6$ is a $C_{(1-8)}$ alkyl radical, also can be employed. Some of the silyl substituted guanidines included within formula (8) are shown by Takago U.S. Pat. Nos. 4,180,642 and 4,248,993.

In addition to the above substituted guanidines, there can be used various amines, for example, di-n-hexylamine, dicyclohexylamine, di-n-octylamine, hexamethoxymethylmelamine, and silylated amines, for example, v-aminopropyltrimethoxysilane and methyldimethoxy-di-n-hexylaminosilane. Methyldimethoxy-di-n-hexylaminosilane acts as both a scavenger and curing accelerator. The primary amines, secondary amines, silylated secondary amines are preferred, and secondary amines, and silylated secondary amines are particularly preferred. Silylated secondary amines such as alkyldialkoxy-n-dialkylaminosilanes and guanidines such as alkyldialkoxyalkylguanidylsilanes which are useful as cure accelerators herein also act as scavengers and, in certain instances, as stabilizers in the compositions of this invention.

Silanol-terminated polydiorganosiloxanes of formula (1), as well as silanol terminated silicone polymers consisting essentially of formula (2) units are well known and preferably have a viscosity in the range of from about 100 to about 400,000 centipoise and more preferred from about 1000 to about 250,000 centipoise when measured at about 25° C. These silanol-terminated fluids can be made by treating a higher molecular weight organopolysiloxane, such as dimethylpolysiloxane with water in the presence of a mineral acid, or base catalyst, to tailor the viscosity of the polymer to the desired range. Methods for making such higher molecular weight organopolysiloxane utilized in the production of silanol-terminated polydiorganosiloxane of formula (1), or having chemically combined formula (2) units, also are well known. For example, hydrolysis of a diorganohalosilane such as dimethyldichlorosilane, diphenyldichlorosilane, methylvinyldichlorosilane, or mixtures thereof, can provide for the production of low molecular weight hydrolyzate. Equilibration thereafter can provide for higher molecular weight organopolysiloxane. Equilibration of cyclopolysiloxane such as octamethylcyclotetrasiloxane, octaphenylcyclotetrasiloxane, or mixtures thereof, will also provide for higher molecular weight polymers. Preferably, such polymers are decatalyzed of equilibration catalyst by standard procedures prior to use, such as shown by Boot U.S. Pat. No. 3,153,007, assigned to the same assignee as the present invention.

Silanol-terminated organopolysiloxanes having viscosities below 1200 centipoises can be made by treating organopolysiloxanes consisting essentially of chemically combined diorganosiloxy units with steam under pressure. Other methods that can be employed to make silanol-terminated polydiorganosiloxanes are more particularly described in U.S. Pat. No. 2,607,792 to Warrick and U.K. Patent No. 835,790.

Effective amounts of the condensation catalysts which can be used in the practice of the present invention to facilitate the cure of the RTV compositions are, for example, 0.001 to 1 part based on the weight of 100 parts of the silanol-terminated polydiorganosiloxane of formula (1). There are included tin compounds, for example, dibutyltindilaurate; dibutyltindiacetate; dibutyltindimethoxide; carbomethoxyphenyl tin tris-uberate; tin octoate; isobutyl tin triceroate; dimethyl tin dibutyrate; dimethyl tin di-neodeconoate; triethyl tin tartrate; dibutyl tin dibenzoate; tin oleate; tin naphthenate; butyltintri-2-ethylhexoate; tinbutyrate. The preferred condensation catalysts are tin compounds and dibutyltindiacetate is particularly preferred.

Titanium compounds which can be used are, for example, 1,3-propanedioxytitanium bis(ethylacetoacetate); 1,3-propanedioxytitanium bis(acetylacetonate); diisopropoxytitanium bis(acetylacetonate); titanium naphthenate; tetrabutyltitanate; tetra-2-ethylhexyltitanate; tetraphenyltitanate; tetraoctadecyltitanate; ethyltriethanolaminetitanate. In addition beta-dicarbonyltitanium compounds as shown by Weyenberg U.S. Pat. No. 3,334,067 can be used as condensation catalysts in the present invention.

Zirconium compounds, for example, zirconium octoate, also can be used.

Further examples of metal condensation catalysts are, for example, lead 2-ethyloctoate; iron 2-ethylhexoate; cobalt 2-ethylhexoate; manganese 2-ethylhexoate; zinc 2-ethylhexoate; antimony octoate; bismuth naphthenate; zinc naphthenate; zinc stearate;.

Examples of nonmetal condensation catalysts are hexylammonium . acetate and benzyltrimethylammonium acetate.

Various fillers and pigments can be incorporated in the silanol or alkoxy-terminated organopolysiloxane, such as for example, titanium dioxide, zirconium silicate, silica aerogel, iron oxide, diatomaceous earth, fumed silica, carbon black, precipitated silica, glass fibers, polyvinyl chloride, ground quartz, calcium carbonate etc. The amounts of filler used can obviously be varied within wide limits in accordance with the intended use. For example, in some sealant applications, the curable compositions of the present invention can be used free of filler. In other applications, such as the employment of the curable compositions for making binding material on a weight basis, as much as 700 parts or more of filler, per 100 parts of organopolysiloxane can be employed. In such applications, the filler can consist of a major amount of extending materials, such as ground quartz, polyvinylchloride, or mixtures thereof, preferably having an average particle size in the range of from 1 to 10 microns.

The compositions of the present invention also can be employed as construction sealants and caulking compounds. The exact amount of filler, therefore, will depend upon such factors as the application for which the organopolysiloxane composition is intended, the type of filler utilized (that is, the density of the filler and its particle size). Preferably, a proportion of from 10 to 300 parts of filler, which can include up to about 35 parts of a reinforcing filler, such as fumed silica filler, per 100 parts of silanol-terminated organopolysiloxane is utilized.

In the practice of the invention, the room temperature vulcanizable compositions can be made by agitating, for example stirring, a mixture of materials which can consist of the silanol terminated polydiorganosiloxane, which hereinafter will include formula (1) or polymer consisting essentially of formula (2) units along with the scavenging silane of formula (3), and crosslinking silane of formula (4), which can be optional, where the blending is performed in the substantial absence of atmospheric moisture. Thereafter the condensation catalyst is added also in the substantial absence of atmospheric moisture.

As used hereinafter, the expressions "moisture-free conditions" and "substantially anhydrous conditions", with reference to making the RTV compositions of the present invention, mean mixing in a dry box, or in a closed container which has been subjected to vacuum to remove air, which thereafter is replaced with a dry inert gas, such as nitrogen. Experience has shown that sufficient scavenging silane of formula (3) should be utilized as previously defined. Temperatures can vary from about 0° C. to about 180° C. depending upon the degree of blending, the type and amount of filler.

A preferred procedure for making the RTV composition of the present invention is to agitate under substantially anhydrous conditions, a mixture of the silanol terminated polydiorganosiloxane, filler and an effective amount of the scavenging silane of formula (3) sufficient to effect the substantial elimination of hydroxy functional radicals and to end cap the polymer. This "end capping" and scavenging procedure can require several minutes, hours, or even days, depending upon factors as the nature of the X leaving group, the number of —OR$^1$ radicals on the scavenging silane, etc. There then can be added to the substantially silanol-free mixture, the condensation catalyst, the cross-linking silane, or mixture thereof, along with other ingredients, for example, the curing accelerator and pigments. A stabilizing excess of the scavenging silane can be used in the initial or final stages of the mixing procedure if desired in amounts previously defined.

In instances where the polyalkoxy-terminated organopolysiloxane of formula (6) is made by a procedure not requiring the use of scavenging silane of formula (3), stabilizing amounts of scavenging silane shown by formulas (5) or (7) can be used. Here, the scavenging silane can be added before, with, or after the addition of condensation catalyst. Alternative procedures for making polyalkoxy-terminated organopolysiloxane are shown as previously indicated by Cooper et al, U.S. Pat. No. 3,542,901.

In order that those skilled in the art will be better able to practice the present invention, the following examples are given by way of illustration and not by way of limitation. All parts are by weight unless otherwise indicated.

EXAMPLE 1

Room temperature vulcanizable one-package RTV compositions were prepared under substantially anhydrous conditions utilizing a dry nitrogen atmosphere after the ingredients had been stripped of air and volatiles under reduced pressure, at ambient temperatures. There was stirred for 15 minutes 100 parts of a silanol-terminated polydimethylsiloxane having a viscosity of about 2500 centipoise and 0.09% by weight of hydroxy radicals attached to silicon with 3.4 parts of methyl-dimethoxy-N-methylacetamidosilane. Based on method of preparation there was obtained a dimethoxy-terminated polydimethylsiloxane of the formula,

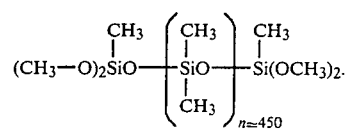

In an alternative procedure, methyldimethoxychlorosilane was used as a chain terminator. This compound is shown by Brown et al, U.S. Pat. No. RE-29760. There was mixed under substantially anhydrous conditions, 6 parts of methyldimethoxychlorosilane, 100 parts of the above described silanol-terminated silane, 6 parts of pyridine and 200 parts of toluene for a period of 30 minutes. There was then added 2 parts of methanol to the mixture. The mixture was then stirred for 30 minutes. The solids were removed and the mixture was stripped.

There was added 0.13 part of dibutyltindimethoxide under substantially anhydrous conditions to the respective dimethoxy-terminated polydimethylsiloxanes made with methyldimethoxy-N-methylacetamidosilane, "Acetamido", and methyldimethoxychlorosilane "Chloro". The respective RTV compositions were then measured for tack-free time immediately upon exposing the mixtures to air at ambient temperatures (25° C.) and after several days of aging at 25° C., 50° C. and 100° C. The following results were obtained.

| Aging (days) | ambient | 50° C. | 100° C. |
|---|---|---|---|
| | Chloro TFT (hours) | | |
| 0 | no cure* | | |
| | Acetamido TFT (hours) | | |
| 0 | 5 | — | — |
| 6 | 5 | 5 | 5 |
| 14 | 5 | 5 | 5 |

*When the RTV composition was exposed to atmospheric moisture it did not cure. The RTV composition remained liquid.

The above results show that the dimethoxy-terminated polydimethylsiloxane based on the use of methyldimethoxy-N-methylacetamidosilane scavenger provides an improved RTV composition as compared to the RTV composition based on the use of methyldimethoxychlorosilane. The above mixture is found to remain substantially the same after a six day and 14 day aging period at ambient temperature and temperatures of 50° C. and 100° C. as the result of exhibiting substantially the same TFT.

A mixture of 100 parts of the above silanol-terminated polydimethylsiloxane, 2 parts of methyldimethoxy-N-methylacetamidosilane and 0.5 part of trimethoxysilylpropyltetramethylguanidine was mixed for 15 minutes under substantially anhydrous conditions and there was then added 0.13 part of dibutyltindimethoxide to the resulting mixture. The mixture was then mixed for an additional 15 minutes and then the stability of the resulting RTV was measured over a period of up to 14 days at ambient temperatures, 50° C. and 100° C. The following results were obtained:

| | Acetamido TFT (min) | | |
|---|---|---|---|
| Aging (days) | Ambient | 50° C. | 100° C. |
| 0 | 25 | — | — |
| 6 | 20 | 20 | 20 |
| 14 | 20 | 20 | 80 |

The above results show that the acetamido RTV of the present invention has a faster TFT as compared to the RTV composition free of the trimethoxysilylpropyltetramethyl guanidine curing accelerator.

EXAMPLE 2

Additional one-package room temperature vulcanizable compositions were prepared consisting of 85 parts of the dimethoxy terminated polydimethylsiloxane and 15 parts of the octamethylcyclotetrasiloxane treated fumed silica filler and 0.23 part of dibutyltindiacetate. These room temperature vulcanizable compositions were prepared under substantially anhydrous conditions and the polymer filler blend was initially injected into plastic tubes followed by the incorporation of 0 to 1.5 part of methyldimethoxy-N-methylacetamidosilane. The dimethoxy terminated polydimethylsiloxane having the same formula as shown in Example 1 was prepared by effecting reaction between 100 parts of the silanol terminated polydimethylsiloxane of Example 1 and 30 parts of methyltrimethoxysilane in the presence of 0.65 part of di-n-hexylamine. The mixture was agitated and heated under dry nitrogen at a temperature of 80° C. for approximately 1 hour and the excess methyltimethoxysilane was then stripped from the mixture.

RTV compositions were prepared from the above ingredients containing 0, 0.5 and up to 1.5 parts of the methyldimethoxy-N-methylacetamidosilane which was added along with the dibutyltindiacetate to plastic tubes containing the blend of the dimethoxy terminated polydimethylsiloxane and the treated fumed silica which was formed by mixing the polymer and filler for 2 hours under nitrogen and then stripped under full vacuum prior to injection into the plastic tubes. The following results were obtained, where TFT (minutes) was determined as in Example 1 and Durometer Hardness (Shore A) indicates a complete cure:

| | TFT (min) | | Durometer | |
|---|---|---|---|---|
| Age (days) | 25° C. | 100° C. | 25° C. | 100° C. |
| | 0 Part Scavenging Silane | | | |
| 0 | 30 | — | — | — |
| 1 | gelled in tube | — | — | — |
| 2 | — | — | — | — |
| | 0.5 Part Scavenging Silane | | | |
| 0 | >60 | — | — | — |
| 1 | 60 | 35 | 28 | 30 |
| 2 | gelled in tube | — | — | — |
| | 1 Part Scavenging Silane | | | |
| 0 | 50 | — | — | — |
| 1 | 35 | 30 | 34 | 34 |
| 2 | — | 30 | — | 29 |

Additional RTV compositions were prepared containing up to 1.5 parts of the scavenging silane per 100 parts of the RTV composition which exhibited substantially the same tack-free time and cure as shown for the 1 part level. The above results further demonstrate that stable RTV compositions can be obtained when a stabilizing amount of scavenging silane, for example, methyldimethoxy-N-methylacetamidosilane is utilized in combination with an effective amount of curing accelerator di-n-hexylamine.

EXAMPLE 3

An RTV composition was prepared under substantially anhydrous conditions by agitating a mixture of 85 parts of the silanol-termnated polydimethylsiloxane, and 15 parts of the treated filler for 2 hours at 130° C. under vacuum. After cooling to room temperature, there was added 2.5 parts of methyldimethoxy-N-methylacetamidosilane, and 0.27 part of a substituted guanidine having the formula,

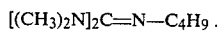

$[(CH_3)_2N]_2C=N-C_4H_9$.

In addition, 2 parts of a titanium chelate, 1,3-propanedioxytitanium bis(ethylacetoacetonate), was used as a condensation catalyst. Unlike the procedure of Example 1, here the condensation catalyst, scavenger and the curing accelerator were added to the polymer at the same time. There was obtained an RTV composition, hereinafter referred to as RTV "A".

The above procedure was repeated, except that 1.0 part of the same titanium chelate was used to make RTV "B", and 0.23 part of the titanium chelate to make RTV "C". In addition, the same RTV compositions were prepared free of the substituted guanidine. The tackfree times (TFT) of the various RTV compositions were then measured at ambient conditions immediately upon mixing and after 24 hours at 100° C. The following results were obtained, where "chelate" is the titanium chelate used:

TABLE I

| RTV | Chelate Parts | Guanidine | TFT (hrs) 25° C. | *100° C. |
|---|---|---|---|---|
| A | 2.0 | 0.27 | 5 | 4 |
|   |     | 0    | 4 | 3 |
| B | 1.0 | 0.27 | 4 | 4 |
|   |     | 0    | — | 4 |
| C | 0.23| 0.27 | 5 | 3 |
|   |     | 0    | 4 | 4 |

*After 24 hours shelf aging.

The above procedure was repeated with RTV "B", except that 2.0 parts of methyltrimethoxysilane was added to the mixture. The TFT's of the RTV's, with and without substituted guanidine was measured up to 3 days at 25° C. and 100° C. The following results were obtained:

TABLE II

| Age (days) | Guanidine | TFT (hrs) 25° C. | 100° C. |
|---|---|---|---|
| 1 | 0.27 | .58 | .58 |
|   | 0    | >15 | 4 |
| 2 | 0.27 | 2.26 | .58 |
|   | 0    | >15 | 2.3 |
| 3 | 0.27 | No cure | 1.4 |
|   | 0    | No cure | 2.4 |

Table I shows that RTV compositions of the present invention containing titanium chelate as a condensation catalyst and free of cross-linking silane remained stable in the presence or absence of an alkyl guanidine. Table II shows that faster TFT's can be obtained if a cross-linking silane is used with alkyl guanidine. Further, a commercially available titanium chelate RTV composition, such as shown by Smith et al U.S. Pat. No. 3,689,454 did not cure after being subjected to the same 100° C. accelerated aging test for 24 hours.

EXAMPLE 4

A room temperature vulcanizable composition "Acetamido", was prepared by mixing under substantially anhydrous conditions, 85 parts of the silanol terminated polydimethylsiloxane of Example 1, 15 parts of octamethylcyclotetrasiloxane treated fumed silica of Example 2, 2.8 parts of methyldimethoxy-N-methylacetamidosilane, 2 parts methyltrimethoxysilane and 0.1 part of dibutyltindimethoxide. There was added to the aforementioned room temperature vulcanizable composition prepared under substantially anhydrous conditions, various amounts of trimethoxysilylpropyltetramethylguanidine to determine the effectiveness of this material as a stabilizer-curing accelerator for the aforementioned Acetamido RTV composition at ambient temperatures and at accelerated aging temperatures after a 1 day shelf age at ambient temperatures, 50° C. and 100° C. Tack-free time (TFT) in minutes, and Durometer Hardness (Shore A) were measured. In addition, a commerically available one-package RTV containing methyltriacetoxysilane "Acetoxy" was used as a control. The mixing sequence was the same as in Example 3. The following results were obtained as shown in Table III:

TABLE III

| Leaving Group | Guanidine (Parts) | TFT (min) 1 day age R.T. | 50° C. | 100° C. | Durometer Hardness (Shore A) 1 day age R.T. | 50° C. | 100° C. |
|---|---|---|---|---|---|---|---|
| Acetamido | 0.00 | >300 | 120 | 33 | 0 | 0 | 0 |
|   | 0.05 | 105 | 95 | 113 | 2 | 2 | 5 |
|   | 0.10 | 106 | 55 | 88 | 9 | 10 | 9 |
|   | 0.20 | 27 | 25 | 48 | 21 | 23 | 24 |
|   | 0.30 | 28 | 25 | 18 | 22 | 24 | 28 |
|   | 0.40 | 30 | 25 | 18 | 23 | 25 | 25 |
| Acetoxy | 0.00 | 20 | 15 | 10 | 25 | 29 | 30 |

A comparison of the results obtained for Acetamido and Acetoxy as set forth in Table III clearly illustrates that the non-corrosive substantially odor-free RTV compositions of the present invention can provide fast cure fully equivalent to commercially available one-part acetoxy RTV sealants without the serious disadvantages of generating corrosive, odoriferous cure by-products.

The above data indicate that the curing accelerator as previously defined also acts as a stabilizer with dibutyltindimethoxide catalyst.

EXAMPLE 5

The procedure of Example 4 was repeated, except that there was utilized 85 parts of the silanol-terminated polydimethylsiloxane, 15 parts of the octamethylcyclotetrasiloxane treated silica filler, 2.8 parts of the methyldimethoxy-N-methylacetamidosilane, 0.4 part of trimethoxysilylpropyltetramethylguanidine, 2.6 parts of the methyltrimethoxysilane and 0.1 part of dibutyltindimethoxide.

The above room temperature vulcanizable composition was then evaluated for stability and other physical properties after a two day aging period at room temperature and at 100° C. The following results were obtained, where TFT is as previously defined:

TABLE IV

|   | Shelf Age Time | RT | 100° C. |
|---|---|---|---|
| TFT (min) | 0 days | 44 | — |
|   | 1 day | 18 | 18 |
|   | 2 days | 18 | 13 |
| Shore A | 2 days | 38 | 40 |
| Tensile (psi) | 2 days | 267 | 235 |
| Elongation (%) | 2 days | 178 | 144 |
| Die "B" Tear | 2 days | 26 | 29 |

The above results show that the room temperature vulcanizable composition of the present invention exhibits superior stability and physical properties after an accelerated aging period at 100° C.

EXAMPLE 6

Additional silanol scavenging silanes were evaluated utilizing the base room temperature vulcanizable formulation of 100 parts of the silanol-terminated polydimethylsiloxane of Example 1, 2 parts of methyldimethoxyisopropylamino silane, 0.5 part of the trimethoxysilylpropyltetramethylguanidine stabilizer-curing accelerator, 3 parts of the crosslinking methyltrimethoxymethylsilane and 0.13 part of dibutyltindimethoxide. The mixing sequence was the same as in Example 3.

The following results were obtained:

| Shelf Age | TFT (min) | | |
|---|---|---|---|
| | 25° C. | 50° C. | 100° C. |
| 0 days | 22 | — | — |
| 3 days | 45 | 45 | No cure |
| 6 days | 31 | 41 | — |
| 13 days | 45 | 73 | — |
| 21 days | 78 | >480 | — |

The reason for the inferior results otained in this example was not definitely determined, but is believed to be attributable to a deleterious amount of methanol contamination in the cross-linker which was not fully scavenged.

EXAMPLE 7

A mixture of 100 parts of the silanol-terminated polydimethylsiloxane of Example 1, 0.5 part of butyltetramethylguanidine, 2 parts of methyltrimethoxysilane, 2 parts of methyldimethoxymethylaminosilane and 0.05 part of dibutyltindiacetate was mixed at the same time under substantially anhydrous conditions for a period of about 15 minutes.

The TFT of the resulting RTV composition was measured over a period of 3 days at ambient temperatures, 50° C. and 100° C. The following results were obtained:

| Shelf Age | RT | TFT (Min) 50° C. | 100° C. |
|---|---|---|---|
| 1 | 40 | 40 | 35 |
| 3 | 40 | 40 | 45 |

The above results show that methyldimethoxymethylaminosilane is a valuable scavenging silane within the practice of the present invention to provide stable RTV compositions.

EXAMPLE 8

An RTV mixture was prepared by mixing at the same time 100 parts of the above silanol-terminated polydimethylsiloxane, 2.3 parts of trimethoxy-N-methylacetamidosilane, 0.5 part of trimethoxysilylpropyltetramethylguanidine and 0.13 part of dibutyltindimethoxide. The resulting RTV formulation was found to have useful properties after accelerated aging at 50° C. and 100° C. over a period of up to 37 days under substantially anhydrous conditions based on the following tack-free time values:

| Shelf Age | RT | TFT (min) 50° C. | 100° C. |
|---|---|---|---|
| 0 days | 45 | — | — |
| 6 days | 30 | 30 | 30 |
| 37 days | 35 | 35 | 35 |

EXAMPLE 9

Additional scavenging silanes, specifically, methyldimethoxyisopropenoxysilane, (Enoxy) and methyldimethoxy-2(1-carboethoxypropenoxy)silane (Ethylacetoacetate) were used at a 4 part level with 85 parts of the silanol-terminated polydimethylsiloxane and 15 parts of the treated silica filler of Example 2.

There was further used with the Enoxy mixture 1 part of methyltrimethoxysilane, 0.4 part of trimethoxysilylpropyltetramethylguanidine and 0.23 part of dibutyltindiacetate. The Ethylacetoacetate mixture was further combined with 0.33 part of butyltetramethylguanidine and 0.23 part of dibutyltindiacetate.

These RTV mixtures were shelf aged up to 2 days at room temperature and 100° C., and their tack-free time were determined. The following results were obtained:

| Shelf Age (days) | RT | TFT (Min) 100° C. |
|---|---|---|
| | Enoxy | |
| 0 | 65 | — |
| 1 | 65 | 70 |
| 2 | 65 | 90 |
| | Ethylacetoacetate | |
| 0 | 10 | — |
| 1 | 10 | 90 |
| 2 | 10 | 85 |

The above results further establish that the above scavenging silanes produce useful RTV compositions in accordance with the practice of the present invention.

EXAMPLE 10

A room temperature vulcanizable composition was prepared in accordance with the present invention by initially mixing 85 parts of the silanol-terminated polydimethylsiloxane of Example 1 and 15 parts of the treated fumed silica of Example 2 for 2 hours at 130° C. under vacuum. There was then added varying amounts of methyldimethoxydi-n-hexylaminosilane which was mixed with the silanol polymer-filler blend for about 15 minutes prior to the introduction of 0.23 part of dibutyltindiacetate which was then added into each mixture and blended for an additional 15 minutes. The following results were obtained, where TFT and Hardness are as defined in Example 2:

| Age (days) | TFT (min) 25° C. | 100° C. | Durometer (Shore A) 25° C. | 100° C. |
|---|---|---|---|---|
| | 2 Parts Scavenging Silane | | | |
| 0 | 35 | — | — | — |
| 1 | gelled in tube | | | |
| 2 | — | — | — | — |
| | 2.5 Parts Scavenging Silane | | | |
| 0 | 25 | — | — | — |
| 1 | gelled in tube | | | |
| 2 | — | — | — | — |
| | 3.0 Parts Scavenging Silane | | | |
| 0 | 20 | — | — | — |
| 1 | 25 | 20 | 28 | 27 |
| 2 | — | gelled in tube | | |
| | 3.5 Parts Scavengine Silane | | | |
| 0 | 40 | — | — | — |
| 1 | 55 | 50 | 27 | 25 |
| 2 | — | 70 | — | 20 |
| | 4 Parts Scavenginq Silane | | | |
| 0 | <60 | — | — | — |
| 1 | 20 | 10 | — | 31 |
| 2 | — | 10 | — | 28 |

The above results show that the room temperature vulcanizable compositions of the present invention can be stabilized by scavenging silanes, such as methyldimethoxydi-n-hexylaminosilane. In addition, it was further found that substantially equivalent results were obtained when the aforementioned scavenging silane was utilized at 5 parts and 6 parts per 100 parts of the RTV composition.

EXAMPLE 11

A room temperature vulcanizable composition was prepared in accordance with the procedure of Example 3 utilizing 85 parts of a silanol-terminated polydimethylsiloxane, 15 parts of octamethylcyclotetrasiloxane treated fumed silica filler, 2.5 parts of methyldimethoxy-N-methylacetamidosilane, 2 parts of methyltrimethoxysilane and 0.23 part of dibutyltindiacetate. In place of the guanidine curing accelerator utilized in Example 4, there was substituted a variety of organic amines to determine the effectiveness of these materials as curing accelerators. The amines were evaluated at 2 catalytic levels, 0.72 millimole and 1.44 millimole, which is approximately equivalent on a mole basis to 0.2 part and 0.4 part of trimethoxysilylpropyltetramethylguanidine, per 100 parts of the base RTV mixture. The results are shown in Table V, where tack-free time (TFT) and Durometer hardness (Shore A) were measured under ambient conditions and after an accelerated aging period at 100° C. for 1 or 2 days. The mixtures were made in plastic tubes by initially injecting the silanol polymer-filler blend into the tubes under substantially anhydrous conditions. There was then stirred into the blend a solution of methyldimethoxy-N-methylacetamidosilane scavenger, methyltrimethoxysilane cross-linker and dibutyltindiacetate catalyst. The following results were obtained:

TABLE V

| Amine | Millimoles | Time at 100° C. (days) | TFT (Min.) | Durometer hardness (Shore A) 24 Hr | 48 Hr |
|---|---|---|---|---|---|
| $(Me_2N)_2—C≡NC_3H_6Si(OMe)_3$ | 1.44 | 1 | 27 | 34 | 35 |
| " | " | 2 | 35 | 30 | 32 |
| " | 0.72 | 1 | 40 | 28 | 30 |
| " | " | 2 | >24 hr | 7 | 13 |
| $(Me_2N)_2—C≡NC_4H_9$ | 1.44 | 1 | 25 | 30 | 35 |
| " | " | 2 | 30 | 34 | 39 |
| " | 0.72 | 1 | 60 | 33 | 34 |
| " | " | 2 | >24 hr | 3 | 6 |
| $H_2NC_3H_6Si(OMe)_3$ | 1.44 | 1 | 45 | 37 | 37 |
| " | " | 2 | 50 | 28 | 32 |
| " | 0.72 | 1 | 40 | 20 | 22 |
| " | " | 2 | No cure | — | — |
| Di-n-hexylamine | 1.44 | 1 | 40 | 30 | 32 |
| " | " | 2 | 30 | 25 | 27 |
| $H_2NC_3H_6Si(OEt)_3$ | " | 1 | 37 | 31 | 34 |
| " | " | 2 | 160 | 21 | — |
| " | 0.72 | 1 | 40 | 23 | 26 |
| " | " | 2 | >24 hr | 3 | 9 |
| Cyclohexylamine | 1.44 | 1 | 60 | 24 | 27 |
| " | " | 2 | 50 | 21 | — |
| " | 0.72 | 1 | 60 | 18 | 21 |
| " | " | 2 | 70 | 23 | 27 |
| Jeffamine T-403* | 1.44 | 1 | 55 | 34 | 37 |
| " | " | 2 | 160 | 21 | — |
| $H_2NC_2H_4NHC_3H_6Si(OMe)_3$ | " | 1 | 45 | 30 | 36 |
| " | " | 2 | Gelled in tube | — | — |
| " | 0.72 | 1 | 105 | 17 | 22 |
| " | " | 2 | 2 | No cure | — |
| Tetramethylpiperidine | 1.44 | 1 | 60 | 19 | 21 |
| " | " | 2 | 30 | 18 | 20 |
| Piperidine | " | 1 | 40 | 26 | 29 |
| " | " | 2 | >8 hr | 6 | 9 |
| DABCO** | " | 1 | 55 | 16 | 23 |
| " | " | 2 | 35 | 13 | — |
| N—methylmorpholine | " | 1 | 55 | 8 | 14 |
| " | " | 2 | 35 | 11 | — |
| N,N'—dimethylethylenediamine | " | 1 | 55 | 9 | 18 |
| " | " | 2 | 35 | 12 | — |
| N—methylpiperidine | " | 1 | Gelled in tube | — | — |
| " | " | 2 | at R.T. | — | — |
| N—hexylamine | " | 1 | 105 | 21 | 23 |
| " | " | 2 | No cure | — | — |
| tributylamine | " | 1 | 70 | 18 | 20 |
| " | " | 2 | No cure | — | — |

*A tris (2-aminopropyl) triol
**1,4-diazabicyclo [2.2.] octane

A higher level of candidate amine stabilizers was evaluated with the same room temperature vulcanizable composition along with a homologous series of dialkylamines. The results are shown in Table VI below:

TABLE VI

| Amine | Millimoles | Time at 100° C. (days) | TFT (Min.) | Durometer hardness (Shore A) 24 Hr | 48 Hr |
|---|---|---|---|---|---|
| $H_2NC_3H_6Si(OEt)_3$ | 2.88 | 1 | 35 | 31 | 31 |
| " | " | 2 | 55 | 25 | 28 |
| $H_2NC_3H_6Si(OMe)_3$ | " | 1 | 35 | 30 | 20 |
| " | " | 2 | 105 | 34 | 25 |

TABLE VI-continued

| Amine | Milli-moles | Time at 100° C. (days) | TFT (Min.) | Durometer hardness (Shore A) | |
|---|---|---|---|---|---|
| | | | | 24 Hr | 48 Hr |
| H$_2$NC$_2$H$_4$NC$_3$H$_6$Si(OMe)$_3$ | " | 1 | 70 | 22 | 23 |
| " | " | 2 | | No cure | |
| Jeffamine T-403 | " | 1 | 60 | 18 | 19 |
| " | " | 2 | | No cure | |
| Tetramethylpiperidine | 2.88 | 1 | 35 | 28 | 28 |
| " | " | 2 | 50 | 28 | 29 |
| Cyclohexylamine | " | 1 | 60 | 15 | 16 |
| " | " | 2 | 50 | 22 | 24 |
| Di-n-hexylamine | " | 1 | 40 | 34 | 35 |
| " | " | 2 | 40 | 37 | 39 |
| Dibutylamine | " | 1 | 45 | 18 | 21 |
| " | " | 2 | 40 | 16 | 19 |
| Dioctylamine | " | 1 | 40 | 36 | 35 |
| " | " | 2 | 45 | 38 | 37 |
| Dicyclohexylamine | " | 1 | 40 | 33 | 33 |
| " | " | 2 | 45 | 34 | 36 |
| Hexamethoxymethylmelamine | " | 1 | 50 | 20 | — |
| " | " | 2 | 17 | 18 | — |
| Methylphenylamine | " | 1 | 20 | 30 | — |
| " | " | 2 | 15 | 29 | — |
| Diphenylamine | " | 1 | 50 | 10 | — |
| " | " | 2 | 70 | 13 | — |
| Diisopropylamine | " | 1 | 35 | 27 | — |
| " | " | 2 | 50 | 30 | — |
| Diisobutylamine | " | 1 | 35 | 17 | — |
| " | " | 2 | 50 | 19 | — |
| Di-n-hexylamine | " | 1 | 40 | 34 | 35 |
| " | " | 2 | 40 | 37 | 39 |
| Diethylamine | " | 1 | 50 | 23 | 26 |
| " | " | 2 | 45 | 20 | 23 |
| Dipropylamine | " | 1 | 50 | 21 | 23 |
| " | " | 2 | 45 | 18 | 21 |

The above results show that effective cure acceleration of the RTV composition can be achieved using higher levels of various organic amines including a variety of dialkyl amines. In addition, certain tertiary amines, for example, N-methylpiperidine and N,N-dimethylaniline were found to be ineffective as cure accelerators at the 2.88 millimole level.

Although the above examples are directed to only a few of the very many variables which can be utilized in the practice of the present invention, it should be understood that the present invention is directed to a much broader variety of room temperature vulcanizable compositions based on the use of a wide variety of silanol-terminated or polyalkoxy-terminated organopolysiloxanes, silane scavengers, cross-linking silanes, mixtures of silane scavengers and cross-linking silanes, as well as one or more of the several substituted guanidine and amine curing accelerators and condensation catalysts as previously described.

What we claim as new and desire to secure by Letters Patent of the United States is:

1. A method of making a one-package and substantially acid-free room temperature vulcanizable composition curable to the solid elastomeric state, which method comprises agitating under substantially anhydrous conditions at a temperature in the range of from 0° C. to 180° C., a room temperature vulcanizable material selected from
   (i) a mixture comprising
      (a) 100 parts of a silanol-terminated polydiorganosiloxane consisting essentially of chemically combined units of the formula

(b) a stabilizing amount of a silane scavenger for hydroxy functional groups of the formula

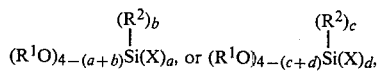

(c) 0.01 to 10 parts of cross-linking silane of the formula

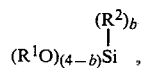

(d) an effective amount of a condensation catalyst, and
      (e) 0 to 5 parts of a curing accelerator selected from the group consisting of substituted guanidines, amines and mixtures thereof; and
   (ii) a mixture comprising
      (a) 100 parts of a polyalkoxy-terminated polydiorganosiloxane of the formula

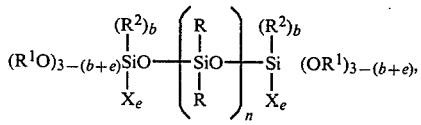

(iii) 0 to 10 parts of a cross-linking silane of the formula, $$(R^1O)_{(4-b)}\overset{(R^2)_b}{\underset{|}{Si}},$$

(iv) an effective amount of a condensation catalyst
(v) a stabilizing amount of a silane scavenger for hydroxy functional groups having the formula $$(R^1O)_{4-(c+f)}\overset{(R^2)_c}{\underset{|}{Si}}(X)_f,$$

and
(vi) 0 to 5 parts of a curing accelerator selected from the group consisting of substituted guanidines, amines and mixtures thereof,
where R is selected from $C_{(1-13)}$ monovalent substituted or unsubstituted hydrocarbon radicals, $R^1$ is a $C_{(1-8)}$ aliphatic organic radical selected from the group consisting of alkyl, alkylether, alkylester, alkylketone and alkylcyano radicals, or a $C_{(7-13)}$ alkaryl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals and, a is an integer equal to 1 or 2, b is a whole number equal to 0 or 1, and the sum of a+b is equal to 1 or 2, c is a whole number equal to 0 to 3 inclusive, d is an integer equal to 1 to 4 inclusive, and the sum of c+d is equal to 3 or 4, e is a whole number equal to 0 or 1 and the sum of b+e is equal to 0 to 1, n is an integer having a value of from about 50 to about 2500 inclusive, c is a whole number equal to 0 to 3 inclusive, f is an integer equal to 1 to 4 inclusive and the sum of c+f is equal to 1 to 4 inclusive, and in either mixture where X is enoxy, there is also added, before or with the scavenger, 0.1 to 5 parts of a curing accelerator selected from the group consisting of substituted guanidines, amines and mixtures thereof.

2. A method in accordance with claim 1, where R, $R^1$ and $R^2$ are methyl.

3. A method in accordance with claim 1, where the curing accelerator is selected from the group consisting of silylated guanidine and alkyl guanidine.

4. A method in accordance with claim 1, where the scavenging silane is a polymethoxyacetamidosilane.

5. A method in accordance with claim 1, where the cross-linking silane is methyltrimethoxysilane.

6. A method in accordance with claim 1, where the condensation catalyst is a tin compound.

7. A method in accordance with claim 4, where the silane scavenger is methyldimethoxy(N-methylacetamido)silane.

8. A mixture comprising
(a) 100 parts of a silanol-terminated polydiorganosiloxane consisting essentially of chemically combined units of the formula $$-\overset{R}{\underset{\underset{R}{|}}{Si}}O-,$$

(b) a stabilizing amount of a silane scavenger for hydroxy functional groups of the formula $$(R^1O)_{4-(a+b)}\overset{(R^2)_b}{\underset{|}{Si}}(X)_a, \text{ or } (R^1O)_{4-(c+d)}\overset{(R^2)_c}{\underset{|}{Si}}(X)_d,$$

(c) 0.01 to 10 parts of cross-linking silane of the formula $$(R^1O)_{(4-b)}\overset{(R^2)_b}{\underset{|}{Si}},$$

(d) an effective amount of a condensation catalyst, and
(e) 0 to 5 parts of a curing accelerator selected from the group consisting of substituted guanidines, amines and mixtures thereof,
where R is selected from $C_{(1-13)}$ monovalent substituted or unsubstituted hydrocarbon radicals, $R^1$ is a $C_{(1-8)}$ aliphatic organic radical selected from the group consisting of alkyl, alkylether, alkylester alkylketone and alkylcyano radicals, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals and, a is an integer equal to 1 or 2, c is a whole number equal to 0 to 3 inclusive, d is an integer equal to 1 to 4 inclusive, and the sum of c+d is equal to 3 or 4, b is a whole number equal to 0 or 1, and the sum of a+b is equal to 1 or 2; and where X is enoxy, 0.1 to 5 parts of a curing accelerator selected from the group consisting of substituted guanidines, amines and mixtures thereof.

9. In the method of making a substantially acid-free room temperature vulcanizable organopolysiloxane composition under substantially anhydrous conditions utilizing an effective amount of a condensation catalyst with a silanol-terminated organopolysiloxane and a polyalkoxysilane cross-linking agent, the improvement which comprises adding to the silanol-terminated organopolysiloxane a stabilizing amount of scavenger for hydroxy functional groups of the formula $$(R^1O)_{4-(c+f)}\overset{(R^2)_c}{\underset{|}{Si}}(X)_f,$$

where $R^1$ is a $C_{(1-8)}$ aliphatic organic radical selected from the group consisting of alkyl, alkylether, alkylester, alkylketone and alkylcyano, or a $C_{(7-13)}$ aralkyl radical, $R^2$ is a $C_{(1-13)}$ monovalent substituted or unsubstituted hydrocarbon radical, X is a hydrolyzable leaving group selected from the group consisting of amido, amino, carbamato, enoxy, imidato, isocyanato, oximato, thioisocyanato and ureido radicals and, c is an integer equal to 0 to 3 inclusive, f is an integer equal to 1 to 4 inclusive, and the sum of c+f is equal to 1 to 4 inclusive, and thereafter adding an effective amount of a condensation catalyst, whereby improved stability is achieved in the resulting room temperature vulcanizable organopolysiloxane composition, and where X is enoxy, adding before or with the scavenger an effective amount of a curing accelerator selected from the group consisting of substituted guanidines, amines and mixtures thereof.

10. A method in accordance with claim 9, where the silane scavenger is methyldimethoxy-N-methylacetamidosilane.

11. A method in accordance with claim 9, where the silane scavenger is methyldimethoxyisopropenoxysilane.

12. A method in accordance with claim 9, where the silane scavenger is methyltriisopropenoxysilane.

13. A method in accordance with claim 9 using an effective amount of dibutyltindiacetate as the condensation catalyst.

* * * * *